Dec. 3, 1968  R. A. MUNSE  3,414,035
FASTENER
Filed Nov. 14, 1966

INVENTOR.
ROBERT A. MUNSE
BY
Pierce, Wilson & Pierce
ATTORNEYS

United States Patent Office 3,414,035
Patented Dec. 3, 1968

3,414,035
FASTENER
Robert A. Munse, Perrysburg, Ohio, assignor, by mesne assignments, to Vare Corporation, New York, N.Y., a corporation of New York
Filed Nov. 14, 1966, Ser. No. 593,919
5 Claims. (Cl. 151—41.75)

ABSTRACT OF THE DISCLOSURE

A one-piece spring metal fastener clip is formed of a plate folded back upon itself to provide upper and lower arms integrally joined by a bight portion. The free ends of the upper and lower arms terminate in upper and lower panels, respectively, the upper panel being inclined upwardly away from the lower panel and the two panels are connected by generally U-shape spring strips along opposite sides of the clip. Integral with the upper panel and lying generally between the spring strips and generally parallel with the lower arm is a portion which is folded upwardly and backwardly upon itself to provide upper and lower plies. In the upper ply there is formed a nut impression which lies above a bolt hole through the lower ply, and a detent lip depends beneath one side of the bolt hole for snapping into a hole on a panel.

---

This invention relates to fasteners of U or J types adapted for use with parts of different thickness with the view of the arms of the fastener engaging opposite faces of the respective part properly to receive a bolt or screw and retain the same in such fastening position. Somewhat similar fasteners are shown in the prior art but there are certain disadvantages inherent in such fasteners which militate against their efficiency. For example, when in position of use, they can be hit so as to force them into disengagement with the part to which they are applied, or they project outwardly in such manner as to interfere with the assembly of other parts. Furthermore, the problem of aligning the nut element with the bolt or screw receiving hole in the fastener arms is not uniformly resolved. Also, the matter of engaging the detent provided in one of the fastener arms in the hole in the part to which the fastener is applied has not been reliable in all instances and particularly where a relatively small bolt or screw-receiving hole in such part exists.

An object is to produce a fastener of this character which satisfactorily copes with the above problems and which is simple in construction, economical to manufacture and is reliable for the purpose intended.

Another object is to produce a fastener of this character in which the nut element is backed up by a juxtaposed plate for substantially increasing the torsional strength of the fastener, thereby increasing its holding power.

Other objects and advantages of the invention will hereinafter appear and, for purposes of illustration but not of limitation, an embodiment of the invention is shown on the accompanying drawings, in which.

Figure 1:
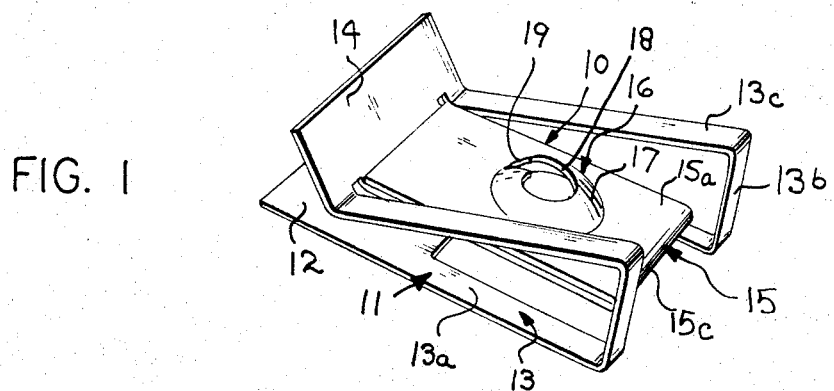
FIGURE 1 is a top perspective view of the clip or fastener.
Figure 2:
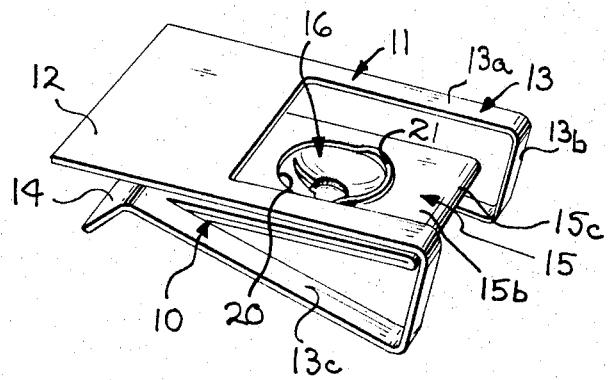
FIGURE 2 is a bottom plan view of the fastener shown in FIGURE 1.
Figure 3:
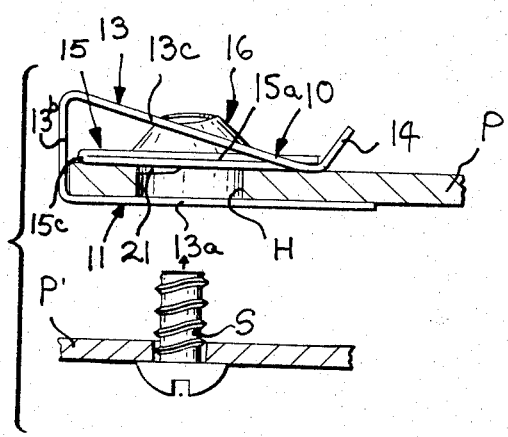
FIGURE 3 is an edge elevation of the fastener applied to an apertured panel and showing a screw for engagement therewith attached to a panel to be connected to the panel to which the fastener is applied.

The illustrated embodiment of the invention comprises a one-piece fastener or clip of spring sheet metal and comprises an upper arm 10 and a lower arm 11. On the lower arm 11 is a flat transverse panel 12 at the free end thereof, and integral with the panel 12 is a pair of laterally spaced generally U-shaped spring strips 13 having flat straight lower arm portions 13a which are disposed in the horizontal plane of the panel 12. At the outer ends of the arm portions 13a and extending upwardly at right angles thereto are bend portions 13b, which, at the upper ends, are integral with downwardly inclined upper arm portions 13c, which extend toward the panel 12. The outer ends of the arm portions 13c are integral with a cross panel 14 which inclines upwardly and outwardly. The panels 12 and 14 are of the same lateral dimensions but the panel 12 in horizontal dimension is substantially greater than that of the cross panel 14. The upward inclination of the cross panel 14 facilitates the application of the clip to an edge portion of a part or panel to which the fastener is connected.

Forming part of the upper arm 10 is a tongue 15, which is arranged between and spaced slightly laterally from, so as to be free of, the upper spring arms 13c and terminates close to but short of the bend portions 13b of the spring arms. The tongue 15 is generally parallel to and spaced from the transverse panel 12 and arm portions 13a and comprises a lower ply 15b integral at its inner end with the cross panel 14 and an upper parallel ply 15a bent back over the lower ply and joined thereto by a bend portion 15c. The upper and lower plies 15a and 15b are preferably flatwise in engagement with each other, substantially as shown on the drawings.

Arranged about centrally of the upper ply 15a is a nut impression 16, which is stamped or formed from the metal of the ply and comprises an upwardly projecting frusto-conical protuberance 17, having a screw-receiving hole 18. The protuberance 17 is radially severed, either slitted or slotted, as indicated at 19, and the edges of the hole 18 at opposite sides of the slit 19 are relatively spaced apart providing a high and low end of a helix which extends from the lower end and continues gradually upward about the edge of the hole to the upper side of the slit. This forms a nut for engagement by a screw S and is of a structure well known in the art and commonly called a "Prestole" so that further description of the construction and operation thereof is not considered necessary. It should be understood that other forms of nut impressions may be employed and if desired a captive or cage nut, well known in the art, may be used to advantage.

In the lower ply 15b is a hole 20, which may be approximately the diameter of the base of the protuberance 17 and is axially aligned with the screw-receiving hole 18. Both the nut impression 16 and the hole 20 are spaced from the inner edge of the transverse panel 12 to afford free access to a screw S. The screw S is shown passing through a hole in a panel P' which it is desired to be attached to a panel P to which the fastener is secured.

Depending from an edge of the hole 20 is an arcuate lip 21 which is generally semicircular and tapered to provide an inclined cam portion. The lip 21 acts as a detent which, upon application to the part or panel P having a hole H adjacent a free edge thereof, the tongue 15 is gradually cammed upwardly until the lip 21 snaps into the hole H thereby to insure the fastener is retained in the proper position of use.

In the applied position of the fastener it will be observed that the tongue 15 and the transverse panel 12 with the adjacent spring arm portions 13a flatly engage opposite faces of the panel P. Such flat parallel relationship obtains regardless (within limitations) of the thickness of the panel P. Thus the fastener may be properly attached to panels or parts of different thicknesses, the spring arms functioning as a yieldable take-up means which adapts the fastener for attachment to parts or panels of any given thickness within a fairly wide range.

It will be observed that when the fastener is applied to the panel P, the transverse panel 12 and spring arm portions 13a flatwise engage the underside of the panel or that side through which the screw S extends, thereby enabling the panel P' to be moved flatwise against the panel P without in any way affecting the fastener in its attached position. It will be further observed that the hole 20, through which the screw or bolt S extends, is relatively wide and always properly disposed with respect to the nut impression 16 for screw reception. A further advantage of the structure resides in the flatwise engagement between the plies 15a and 15b of the tongue 15 and since these are in face to face relation, the nut impression is backed up by a metal plate which greatly increases the strength of the nut and militates against adverse deformation thereof. The size of the screw-receiving hole 20 can be reduced without detracting from the efficiency of the fastener and can be made smaller to cope with relatively small holes in the panel P and still permit free accessibility of the screw to the nut.

The fastener above described may be used to advantage as a clip for the purpose, as an example, of clamping together two or more panels or parts, the thickness of which may vary. Thus the nut means and the aligned hole in the plies of the tongue 15 would not in this instance be required. An advantage of such construction is that it enables the flatwise engagement of opposite faces of the panels thus effecting a more uniform and reliable gripping action. The double thickness of the tongue 15 enhances the strength of the clip and militates against deformation and irregularities in the surface contact of the respective arm of the clip.

Numerous changes in details of construction, arrangement and choice of material may be effected without departing from the spirit of the invention, especially as defined in the appended claims. For example, the fastener may be of J form which can be readily effected by shortening the lower arm of the clip as by substantially reducing the length of the transverse panel 12.

What I claim is:

1. A one-piece spring metal fastener clip comprising a tongue folded upon itself at one end to provide two plies in face to face engagement substantially throughout their lengths and breadth, generally U-shaped spring means joined by a first flat cross panel to one of said plies remote from the folded end, said spring means comprising parallel spring strips arranged respectievly on opposite sides of said tongue with upper portions inclining upwardly beyond said folded end of said tongue and lower portions arranged generally parallel to said tongue, and a second flat cross panel to which the ends of the lower portions of said spring strips are connected disposed parallel to said tongue, said first cross panel being inclined upwardly from free ends of the upper portions of said spring strips, said upper ply having threaded opening means therethrough, said lower ply having an opening therethrough registering with the threaded opening means through said upper panel, and detent means on the lower ply.

2. A spring metal fastener clip comprising:
a pair of laterally spaced spring strips bent generally in U-shape and constituting portions of upper and lower arms joined by a bight, wherein the strips in the upper arm inclined downwardly from the bight toward the lower arm,
upper and lower panels integral with and extending across the strips at opposite free ends thereof and constituting the remainders of the upper and lower arms, respectively,
the upper panel inclining upwardly and away from the lower panel and the strips in the upper arm, and
a tongue disposed generally between the strips in the upper arm and comprising
a lower ply integral with the upper panel and having a free end disposed therefrom towards the bight, and
an upper ply joined to the free end of the lower ply by a bend and extending from said bend back towards the upper panel and in face-to-face engagement with the lower ply,
said upper ply having an opening therethrough and means for engaging the thread of a fastener,
said lower ply having an opening therethrough registering with the opening through the upper ply for accommodating said fastener.

3. The combination claimed in claim 2, and detent means depending from adjacent the opening in the lower ply for engaging in an opening in a panel embraced by said upper and lower arms.

4. The combination claimed in claim 3, said detent means comprising a lip extending downwardly from the edge of the opening through the lower ply.

5. The combination claimed in claim 2, said lower arm being disposed in a single plane, said tongue being substantially parallel to the plane of said lower arm.

References Cited

UNITED STATES PATENTS

| 2,228,584 | 1/1941 | Place | 151—41.75 |
| 2,581,481 | 1/1952 | Hartman et al. | 151—41.75 |
| 3,009,499 | 11/1961 | Weihe | 151—41.75 |

EDWARD C. ALLEN, *Primary Examiner.*